United States Patent [19]

Bedard

[11] Patent Number: 4,948,326

[45] Date of Patent: Aug. 14, 1990

[54] LOAD LIFTING ATTACHMENT MOUNTED ON A TRUCK FRAME

[76] Inventor: Henry Bedard, 1001 - 47 Agnes Street, New Westminster, British Columbia, Canada, V3L 1E2

[21] Appl. No.: 312,315

[22] Filed: Feb. 14, 1989

Related U.S. Application Data

[63] Continuation of Ser. No. 53,053, May 22, 1987, abandoned.

[51] Int. Cl.$^5$ .............................................. B60P 1/54
[52] U.S. Cl. ................................... 414/541; 414/540; 414/785; 414/635; 414/642; 187/9 R; 212/261; 212/265; 212/182
[58] Field of Search ............... 414/539, 540, 541, 785, 414/686, 680, 547, 543, 546, 553, 631, 632, 634, 635, 636, 638, 637, 641, 642; 187/9 R, 9 E; 212/261, 268, 265, 182

[56] References Cited

U.S. PATENT DOCUMENTS

| | | | |
|---|---|---|---|
| 1,289,786 | 12/1918 | Ittner | 414/477 |
| 2,459,506 | 1/1949 | Dempster | 414/920 |
| 2,639,825 | 5/1953 | Eakin | 414/541 X |
| 2,682,957 | 7/1954 | Holmes | 414/920 |
| 2,708,047 | 3/1951 | Seidle | 414/477 |
| 2,726,115 | 5/1953 | Babcock | 414/477 |
| 3,013,676 | 12/1961 | Daniels, Jr. | 414/539 X |
| 3,092,367 | 6/1963 | Selby | 414/541 X |
| 3,522,894 | 8/1968 | Tornheim | 414/469 |
| 3,799,379 | 3/1974 | Grether | 414/498 |
| 3,942,664 | 3/1976 | Lemaire | 414/498 |
| 3,966,064 | 6/1976 | Felburn | 414/920 |
| 3,971,486 | 7/1976 | Carlsson | 414/498 |
| 4,078,818 | 3/1978 | Donnelly | 414/539 X |
| 4,265,585 | 5/1981 | Hawkins | 414/541 |
| 4,325,666 | 4/1982 | Chain | 414/471 |
| 4,548,542 | 10/1985 | Reese | 414/541 X |

FOREIGN PATENT DOCUMENTS

| | | | |
|---|---|---|---|
| 64304 | 11/1982 | European Pat. Off. | 414/540 |
| 2416938 | 10/1975 | Fed. Rep. of Germany | 414/542 |
| 1088967 | 4/1984 | U.S.S.R. | 414/542 |

*Primary Examiner*—Frank E. Werner
*Attorney, Agent, or Firm*—Klarquist, Sparkman, Campbell, Leigh & Whinston

[57] ABSTRACT

A load lifting attachment suitable for mounting on a truck or other vehicle frame which can handle, load, unload, lift and transport various loads including containers and pallets. The attachment is pivotally mounted behind a truck cab by mounting on a pair of support beams which in turn are pivotally mounted to the truck frame. The attachment is pivoted to a raised position away from the rear of the truck frame when not in use permitting unimpeded connection of a trailer or the like to the truck frame by a fifth wheel or other trailer attaching device. When not in use, the load lifting attachment may be secured to the truck cab. When in use, the attachment is pivoted to a lowered position.

3 Claims, 4 Drawing Sheets

LOAD LIFTING ATTACHMENT MOUNTED ON A TRUCK FRAME

This application is a continuation, of application Ser. No. 07/053,053, filed May 22, 1987, now abandoned.

FIELD OF THE INVENTION

This invention relates to an attachment mounted on a truck or other vehicle frame for handling, loading, unloading, lifting and transporting various loads including containers and pallets.

BACKGROUND OF THE INVENTION

A common practice in loading and unloading trailers is to employ a fork lift truck which can lift and move loads onto or off of a trailer. However, in some locations, particularly in isolated areas, no fork lift truck may be available. In such locations, the trailer must be unloaded by hand or a fork lift truck must be temporarily obtained. Consequently, the down time during which the trailer is left at a particular location may be increased. Likewise, the cost of loading or unloading a trailer may be increased, both due to increased costs of labor to hand load or unload the trailer, or charges for a fork lift truck if one is available. Demurrage or downtime costs may also be incurred. The problem is particularly severe where the truck and driver must wait for the trailer to be unloaded before they can continue transporting goods. It is therefore desirable to provide a fork lift or similar attachment which can be mounted on and carried with a truck for use in loading and unloading goods carried on the truck or on a trailer pulled by the truck.

One method of combining a fork lift with a truck and trailer combination is to attach a separate fork lift truck to the truck cab as in U.S. Pat. No. 3,799,379 to Grether et. al. Another possible method is to attach a fixed fork lift mechanism to the rear of a truck as in U.S. Pat. No. 3,971,486 to Carlsson. The disadvantage of both Grether et. al. and Carlsson is that a trailer cannot be attached to the fifth wheel of the truck because the fork lift mechanism is in the way and will prevent such attachment. Another method is to attach a mechanism to the rear of the truck frame as in U.S. Pat. No. 3,966,064 to Felburn. The disadvantages of Felburn are that the load can only be lifted to a limited degree, that most of the weight of the load is placed on the hydraulic lift and support beams rather than directly on the truck frame, that the fifth wheel is on the lifting mechanism thereby decreasing its stability and safety and that the forks do not move in a true vertical direction. Consequently, a need exists for a fork lift mechanism mounted on a truck frame which can pivot clear of the rear of the truck when not in use and which can operate as a conventional fork lift when in use.

The present invention is designed for use with a motor vehicle having a forward cab, a frame extending rearwardly of the cab and a fifth wheel coupling means for coupling and towing a trailer.

An object of the present invention is to provide a new and improved combination of a load lifting attachment with such a vehicle; the attachment being capable of managing substantial loads when it is in use, and not impeding use of the vehicle for towing purposes when it is not in use.

SUMMARY OF THE INVENTION

In accordance with a broad aspect of the present invention, there is provided a combination as aforesaid in which the load lifting attachment comprises a pair of parallel spaced support beams pivotally mounted at first ends of the beams on opposed sides of the frame between the cab and the coupling means in close proximity to the cab. The beams are so mounted for pivotal movement about an axis extending transversely through the frame between the first ends. A load holding mechanism (for example, a fork lift) is mounted between second ends of the beams perpendicularly away from the common beam axis. In addition, means are provided for rotating the beam with the load holding mechanism between a lowered position whereat the second ends of the beams are supported by the frame and the load holding mechanism extends rearwardly of the frame, and a raised position whereat at substantial portion of the frame behind the cab extends rearwardly clear of the region beneath the beams and the load holding mechanism to enable the coupling of a trailer to the fifth wheel.

Various load holding mechanisms may be implemented. Preferably, however, the mechanism will comprise a fork lift tiltably mounted at the second ends of the beams along a tilt axis extending parallel to the beam axis and means for tilting the fork lift about the tilt axis. This will permit flexibility in the handling and movement of a variety of loads.

In a further embodiment of this invention the fork lift further includes a pair of parallel spaced fork lift booms and parallel spaced fork members mounted to the booms for linear travel therealong. The fork members are rotatable relative to the booms between an operative position in which the fork members extend rearwardly of the frame when the attachment is in the lowered position and an inoperative storage position.

BRIEF DESCRIPTION OF THE DRAWINGS

The present invention will now be described with reference to the drawings in which.

DETAILED DESCRIPTION OF PREFERRED EMBODIMENT

Figure 1:
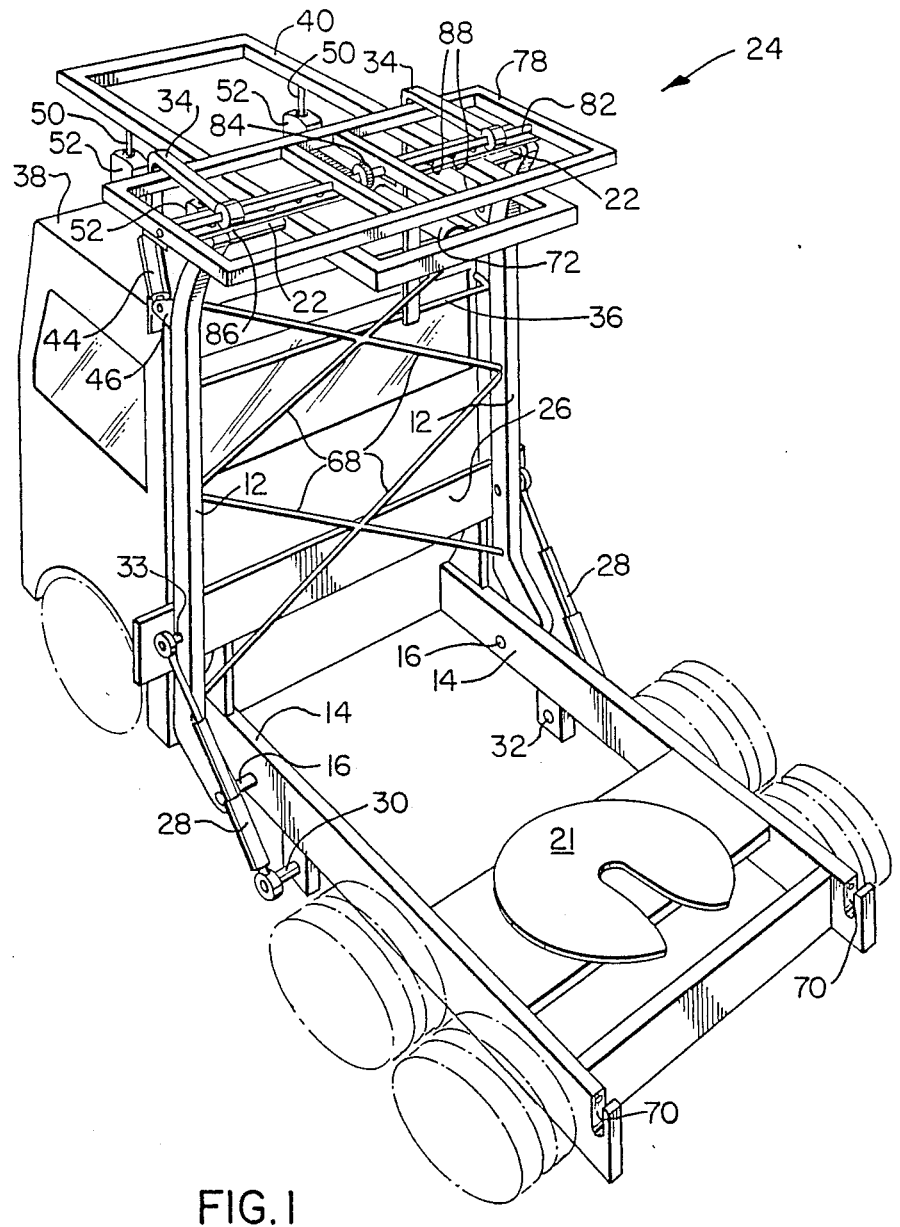
FIG. 1 a perspective view of the top, rear and left side of a truck, including the top and rear and left side of the truck cab, showing the load lifting attachment in its raised position.
Figure 2:
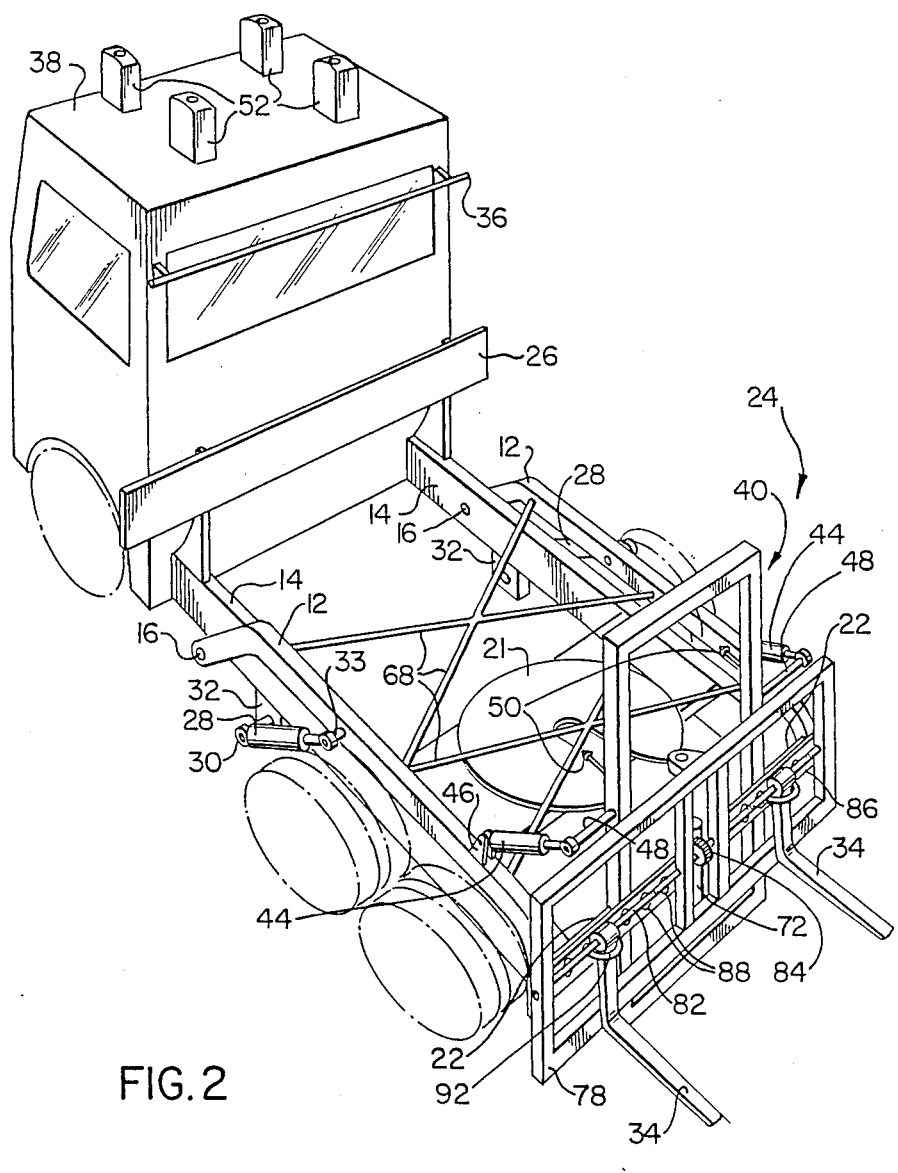
FIG. 2 a perspective view as in FIG. 1 but showing the load lifting attachment in its lowered position.
Figure 3:
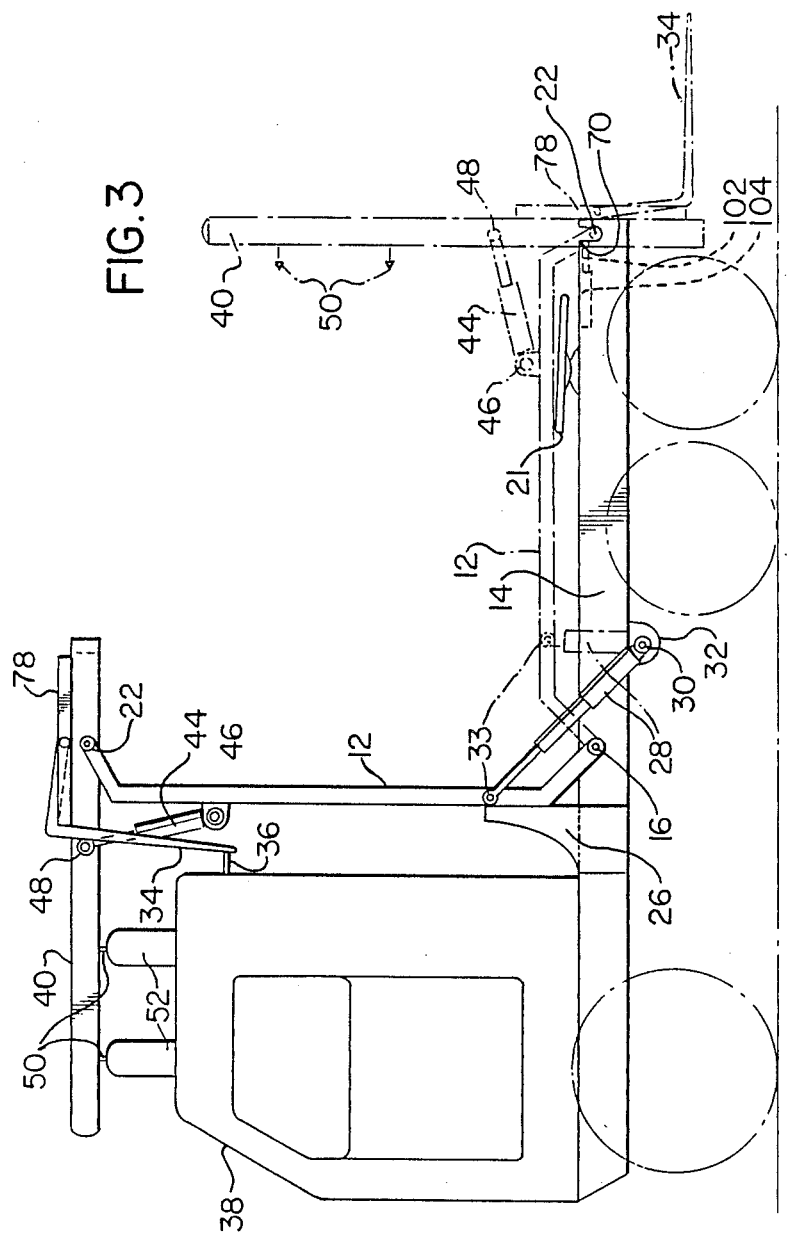
FIG. 3 a side view of the truck showing the load lifting attachment in a raised position (broken lines) and in a lowered position (solid lines).

Referring now to FIG. 1, there is shown a load lifting attachment which embodies a load holding mechanism in accordance with a preferred embodiment of the present invention. The attachment includes two support beams 12, each pivotally mounted on opposite sides of truck frame 14 at first ends of the beams by shaft 16. When beams 12 are in the raised position as shown in FIG. 1, a substantial portion of the frame behind the cab extends clear of the load lifting attachment permitting unimpeded access for coupling a trailer to the truck frame by means of fifth wheel 21. As shown in FIGS. 2 and 3, when support beams 12 are in the lowered position the second ends of the beams are directly supported by truck frame 14.

The raised position of the load lifting attachment as shown in FIG. 1 is an inoperative storage position.

The load lifting attachment includes a load holding mechanism in the form of a fork lift 24 attached to truck frame 14 by way of two pivotally mounted C-shaped support beams 12. The first end of each support beam 12 is pivotally attached at shafts 16 to the outside of truck frame 1 at a point near cab 38. Shafts 22 pivotally attach the second end of each support beam 12 to fork lift 24.

Support beams 12 are rotatable about a beam axis aligned with the axes of shafts 16 and extending transversely through truck frame 14. They are rotatable between a lowered position where fork lift 24 extends rearwardly of truck frame 14, and a raised position where a substantial portion of truck frame 14 behind cab 38 extends rearwardly clear of the region beneath beams 12 and the fork lift. When in the raised position, support beams 12 rest against support plate 26 which is mounted on truck frame 14 in front of shaft 16.

Two hydraulic cylinders 28 are a means for rotating support beam 12 about its point of attachment with shafts 16 and are pivotally attached to each side of truck frame 14 by bolt 30. Bolt 30 is pivotally attached to plate 32 which is rigidly attached to truck frame 14 and permits pivotal movement of hydraulic cylinders 28 about the beam axis. Hydraulic cylinders 28 are pivotally attached to respective support beams 12 by second bolts 33 also permitting pivotal movement of support beams 12 about said beam axis.

Also shown in FIG. 1 are two fork members 34 with ends pointed downward toward truck frame 14. Each fork member 34 is a parallel to support beams 12 and rests adjacent bar 36 (best seen in FIG. 2) which bar extends rearward from cab 38. Hydraulic cylinders 28 apply pressure on support beams 12 to secure support beams 12 against support plate 26 and fork members 34 against bar 36. In addition to supporting fork members 34 and support beams 12, bar 36 acts as protective stop to prevent fork members 34 or support beams 12 from striking the rear of cab 38.

Referring to FIG. 2, the load lifting attachment is shown in a lowered position where fork lift 24 extends rearwardly of frame 14. Here, the fork lift is in position for use being directly supported by frame 14. Two support beams 12 extend substantially horizontally in a rearward direction with two parallel fork lift booms 40 pivotally attached by shafts 22 to second ends thereof. Booms 40 being substantially perpendicular to support beams 12 and being pivotal about a tilt axis extending generally parallel to the beam axis. Two hydraulic cylinders 44 are a means for pivoting fork lift booms 40 about said tilt axis. Hydraulic cylinders 44 are pivotally attached to each support beam 12 by bolt 46 at one end and pivotally attached to fork lift boom 40 by bolt 48 at the other end. This permits pivotal movement about said tilt axis at each end of hydraulic cylinders 44. Support beams 12 have a plurality of cross-bars 68 attached between the beams 12 to stabilize and reinforce the beams. Note that fork members 34 point substantially rearward when in position for use.

As can be seen in FIGS. 1 and 3, U-shaped recesses 70 are provided on opposed sides at the end of frame 14. These recesses are designed to receive shafts 22 thereby providing support as noted above. Fork lift 24 is secured into recess 70 by means of moveable pin 102 which may be moved horizontally across the top of recess 70 by hydraulic cylinder 104 to secure shaft 22 in the recess. This permits pivotal movement of fork lift boom 40 about its tilt axis by means of hydraulic cylinder 44. When it is desired to raise the load lifting attachment from its lowered position to its raised position, pin 102 is moved in a forward direction thereby opening top of recess 70. Shaft 22 and fork lift 24 are then free to permit pivoting of support beams 12 to the raised position.

Each fork lift boom 40 includes a pair of capped bars 50 attached to the forward side of the boom. Such bars are used to secure fork lift 24 to the roof of cab 38 when the load lifting attachment is in the raised position. Four coupling assemblies 52, one for each bar 50, are provided on the roof of cab 38 to facilitate the connection.

Figure 4:
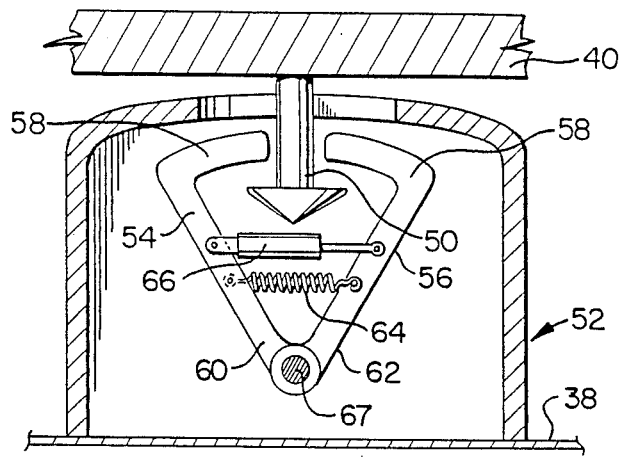
FIG. 4 a close up side view of the securing means on the top of the cab with the booms of the load lifting attachment secured thereto.

The configuration of capped bars 50 and their connection with coupling assemblies 52 is best illustrated in FIG. 4. As can be seen, bar 50 fits inside an outer housing of coupling assembly 52. The housing contains hooked shafts 54 and 56 each with a hooked upper end 58. Upper ends 58 face each other and are of suitable size to fit around and securely hold the capped end of bar 50. The lower end 60 of hooked shaft 54 is pivotally joined to lower end 62 of hooked shaft 56 at joint 67. Spring 64 provides inward biasing on hooked shafts 54 and 56, but permits the cap of bar 50 to be lowered between ends 58 to a point of coupling engagement with such ends. Hydraulic cylinder 66 is a means for applying pressure against the biasing of spring 64 separating shafts 54 and 56. When shafts 54 and 56 are so separated the caps of bar 50 may be lifted from the outer housing of coupling assembly 52.

Figure 5:
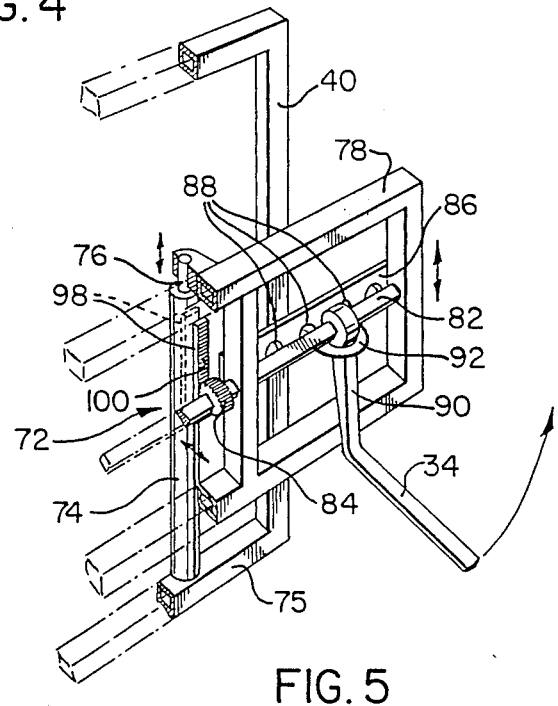
FIG. 5 a perspective view of components used to rotate the fork members.

FIG. 5 shows a portion of fork lift boom 40 which enables fork members 34 to be rotated between an operative position as shown in FIG. 2 and an inoperative storage position as shown in FIG. 1. Hydraulic cylinder 72 with cylinder base 74 is attached to lower cross member 75 joining fork lift booms 40. Cylinder piston 76 of hydraulic cylinder 72 is attached to carriage 78 and supports fork members 34. Carriage 78 travels vertically along fork lift booms 40 upon vertical movement of piston 76. Horizontal bar 82 is attached to carriage 78 at each of the bar. Bar 82 is square in cross-section with the rear end of each fork member 34 attached thereon such that fork members 34 can freely slide along the length of bar 82 and whereby fork member 34 will rotate when bar 82 is rotated. Horizontal plate 86 is attached to carriage 78 below and parallel to bar 82, and is attached to carriage 78 at each end of plate 86. Plate 86 contains a plurality of holes 88 spaced apart a distance substantially equal to the width of fork member 34. Carriage 78 also prevents lowering of ends of fork member 34 beyond a generally horizontal position. Fork member 34 may be releasably secured to plate 86 by use of a U-shaped clamp 92 securely fitting around the fork member. Each end of clamp 92 fits into an adjacent hole 88 in plate 86. Cotton pins (not shown) fit into holes in each end of clamp 92 and secure the clamp around fork member 34 and in holes 88.

The rotation of fork members 34 between an operative position in which the fork members extend rearwardly of truck frame 14 when the load lifting attachment is in a lowered position as shown in FIG. 2 and an inoperative storage position when the load lifting attachment is in a raised position as shown in FIG. 1, is best seen in FIG. 5. Cylinder base 74 has a retractable bar 98 mounted on the side of the base facing circular gear 84. Circular gear 84 is mounted concentrically on bar 82. Cylinder base 74 has teeth 100 matching the teeth of circular gear 84. When it is desired to rotate fork members 34 from an operative position to an inoperative storage position the carriage 78 and thereby circular gear 84 are lowered by cylinder piston 76 to a position opposite lower end of teeth 100 on retractable bar 98. Bar 98 is then moved outward from its retracted position to mesh with teeth of circular gear 84. Piston 76 is then moved upward rotating gear 84 as it moves along teeth 100 of retractable bar 98 until the gear is near the top of the teeth. Fork members 34 are then in an inoperative storage position. Retractable bar 98 is then retracted away from circular gear. The rotate fork members 34 between an inoperative storage position and an operative position the above step are reversed.

As indicated above, there is unimpeded access for coupling a trailer when beams 12 are in the raised position shown in FIG. 1. In this regard, it will be apparent that beams 12 and fork lift 24 will in this position not only lie forward of a trailer (not shown) coupled to fifth wheel 21, but will not extend beneath or alongside the trailer. Thus, not only does the design not require adjustment to ensure vertical or lateral clearance between the trailer and the load lifting attachment that would be required if the design were otherwise, but it also leaves unimpeded access to the fifth wheel coupling when the trailer is coupled.

As is also pointed out above, the second ends of beam 12 are supported by frame 14 when the beams are in their lowered position as shown in FIGS. 2 and 3. This support is enhanced by the provision of U-shaped recesses 70. As a consequence of such support, loads on fork lift 24 can be substantial without imposing corresponding substantial moment arms on the beams or about the axes of shafts 16 at the first ends of the beams. It follows that hydraulic cylinders 28 need not be capable of handling particularly heavy loads except that which is necessary to rotate the assembly between its lowered and raised position.

It will be understood that various changes can be made in the form, details, arrangement and proportions of the various parts without departing from the scope of my invention. This invention is not to be construed as limit to the embodiment described above but is to be afforded the full scope as set forth in the appended claims.

I claim:
1. In combination with a motor vehicle having a forward cab, a frame extended rearwardly of said cab and a fifth wheel coupling means for coupling and towing a trailer, a load lifting attachment comprising:
  (a) a pair spaced support beams pivotally mounted at first ends thereof on opposed sides of said frame between said cab and said coupling means in close proximity to said cab for pivotal movement between a beam axis extending transversely through said frame;
  (b) a fork lift tiltably mounted between second ends of said beams for pivotal movement about a tilt axis extending parallel to said beam axis, said fork lift comprising:
    (i) a pair of parallel spaced fork lift booms, normally extending upright when said attachment is in said lowered position and said fork lift is not titled; and
    (ii) parallel spaced fork members mounted to said booms for linear travel therealong, said fork members being rotatable relative to said booms between an operative position in which said fork members extend rearwardly of said frame when said attachment is in said lowered position and an inoperative storage position displaced through an angle of substantially 180° degrees from said operative position;
  (c) means for tilting said fork lift about said tilt axis; and
  (d) means for rotating said beams about said beam axis between a lowered position whereat said second ends of said beams are supported by said frame and said fork lift extends rearwardly of said frame, and a raised position whereat a substantial portion of said frame behind said cab extends rearwardly clear of the region beneath said beams and said fork lift.

2. A load lifting attachment as defined in claim 1, wherein said booms extend above said cab when said beams are in said raised position.

3. A Load lifting attachment as defined in claim 2 including securing means for securing said fork lift to said cab when said beams are in said raised position.

* * * * *